Sept. 23, 1941.  H. D. GEYER ET AL  2,256,708
FRICTION CLUTCH
Filed April 3, 1939
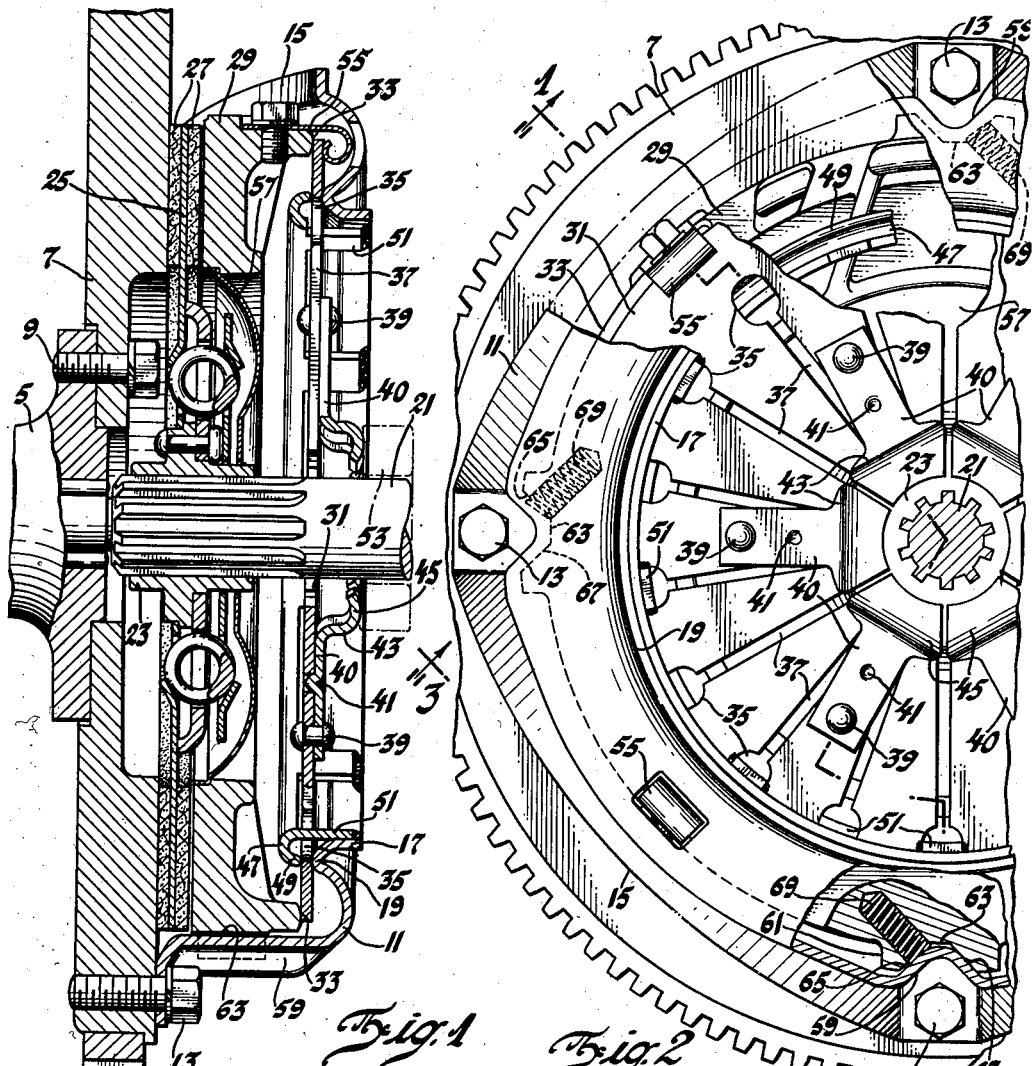
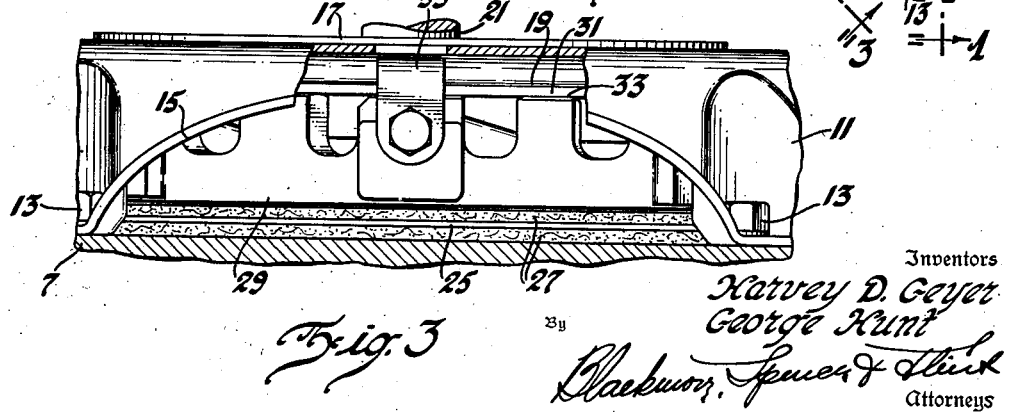
Inventors
Harvey D. Geyer
George Hunt
By Blackmon, Spencer & Hunt
Attorneys Patented Sept. 23, 1941

2,256,708

UNITED STATES PATENT OFFICE 2,256,708

FRICTION CLUTCH

Harvey D. Geyer and George Hunt, Dayton, Ohio, assignors to General Motors Corporation, Detroit, Mich., a corporation of Delaware Application April 3, 1939, Serial No. 265,729

4 Claims. (Cl. 192—68)

This invention relates to friction clutches and is the result of an effort to improve the action of the clutch between the engine shaft of a motor vehicle and the input shaft of the change speed transmission.

In clutches of the above kind there is usually provided a pressure plate which has a movement axially toward and from the flywheel and the pressure plate has a driving engagement with the flywheel cover. It is a specific object of this invention to improve the aforesaid driving connection.

On the accompanying drawing:

Figure 1 shows a transverse section through the improved clutch.

Figure 2 is a view in elevation partly broken away.

Figure 3 is a view as seen from line 3—3 of Figure 2.

Referring by reference characters to the drawing, numeral 5 is used to identify the engine shaft to which is secured a flywheel 7 by fastening means 9. To the flywheel is secured a cover 11 which is formed by stamping from a substantially square sheet. The cover is secured at 13 to the flywheel. The shaping of the blank to form the cover provides arched open regions marked 15 between the adjacent attached regions. The cover has a central opening of circular outline having a boundary wall extending axially and marked 17. Adjacent portion 17 of the cover there is an annular bulged region marked 19, this bulged region 19 serving a purpose to be explained later. Projecting into the clutch cover from the change speed transmission is the clutch driven shaft 21. Mounted to rotate with shaft 21 but slidable thereon is a driven member comprising a hub 23 and a driven plate 25, the latter having friction facings 27. Between the hub and the driven plate are torque cushioning springs to transmit the drive between said parts. To press the driven plate against the flywheel is a pressure plate 29. The spring to cause the driven plate to be gripped between the pressure plate and flywheel is a normally coned disc 31. It contacts along its outer marginal edge at 33 with the pressure plate and is somewhat flattened from its free coned shape to contact the cover in a circular line contact at 19. Radially inward from the circular line at 19 the spring has openings 35 and slots 37. To release the clutch there are fastened to the spring at 39 a plurality of fingers 40 extending toward the shaft 21. Adjacent the riveted connections at 39 are interlocking parts at 41 to prevent rotation of the fingers about 39 as centers. The fingers are bent axially at 43 and then rebent at 45 to form a circular abutment adapted to be engaged by any preferred form of throwout collar. A circular ring is seen at 47. It has a rounded end forming a circular abutment 49 located adjacent the cover abutment 19. The ring has tongues 51 projecting through the spring openings 35 and these tongues are welded or otherwise secured to the cover at 17. Reciprocation to the left of collar 53 takes the load of the spring from abutment 19 and further movement relieves the pressure of the spring on the pressure plate 29, the region 49 serving as a fulcrum. Some suitable spring means such as 55 is used to insure the withdrawal of the pressure plate. There is an oil baffle marked 57 consisting of a steel stamping having a marginal region press fitted to the pressure plate and a central opening adjacent the hub 23. It guards against oil from the bearings reaching the friction facings of the driven plate. Adjacent each corner of the cover plate there are radial indentations 59 extending axially. The pressure plate is formed with four lugs each having a notch 63 adjacent the indentations of the cover plate. The angular faces of the indentations and notches are parallel and positioned closely adjacent each other as shown in Figure 2. This arrangement provides for the joint rotation of the cover and pressure plate and also permits axial movement of the pressure plate for the purpose of releasing the clutch. The dimensions are such as to provide a slight clearance at one side 65 or the other 67 of the indentations. When the engine is driving the car contact occurs at 67. When the car is driving the engine, contact tends to occur at 65. In the process of driving there may be interruptions of the drive from the engine which would occasion contact first at 67 then at 65. To prevent the shifting of contact the pressure plate has a pocket, the axis of which is at right angles to the face of the indentation and on what may be called the trailing side of the driving member. Within this pocket is a spring 69 operable against the trailing face of the indentation. There is thus avoided a frequently shifting of contact between the regions 65 and 67. Owing to the diametrically opposite arrangement of the several springs it will be seen that they serve to center the pressure plate relative to the cover plate both when the parts are being balanced in the process of manufacture and also when the clutch is released after being assembled.

We claim:

1. In a clutch, a pressure plate, driving means including a driving member surrounding the pressure plate, a driven member between the driving means and the pressure plate, interengaging peripheral formations on the pressure plate and driving member to permit reciprocation of the pressure plate and to prevent relative rotation, the formations on the pressure plate and driving member having first and second pairs of faces, the faces of each pair being parallel, a spring carried by one of the faces of the first pair to dispose the sliding clearance between said first pair of faces and to maintain constant contact between the faces of the second pair.

2. The invention defined by claim 1, the pressure plate formation having a recess to carry said spring.

3. The invention defined by claim 1, there being a plurality of said cooperating formations disposed circumferentially whereby said springs may centralize said pressure plate.

4. The invention defined by claim 1, said spring being disposed to maintain the clearance between the trailing pair of faces.

HARVEY D. GEYER.
GEORGE HUNT.